United States Patent [19]

Krysiak

[11] Patent Number: 5,507,545
[45] Date of Patent: Apr. 16, 1996

[54] VISOR CLIP ASSEMBLY AND RELEASABLE FASTENER

[75] Inventor: David J. Krysiak, Oak Park, Mich.

[73] Assignee: TRW Inc., Cleveland, Ohio

[21] Appl. No.: 270,463

[22] Filed: Jul. 5, 1994

[51] Int. Cl.$^6$ ....................................................... B60J 3/00
[52] U.S. Cl. ................... 296/97.9; 24/453; 24/607; 248/304; 248/222.12; 411/41; 411/48
[58] Field of Search .................... 296/214, 97.9; 24/297, 453, 607; 411/41, 45, 48; 248/71, 301, 303, 304, 222.1, 221.4

[56] References Cited

U.S. PATENT DOCUMENTS

| | | | |
|---|---|---|---|
| 3,918,130 | 11/1975 | Poe | 24/73 P |
| 4,637,765 | 1/1987 | Omata | 411/41 |
| 4,832,547 | 5/1989 | Shiraishi | 411/42 |
| 4,840,523 | 6/1989 | Oshida | 411/48 |
| 4,981,323 | 1/1991 | Dowd et al. | 296/214 |
| 5,085,545 | 2/1992 | Takahashi | 411/45 |
| 5,163,795 | 11/1992 | Benoit et al. | 411/45 |
| 5,201,623 | 4/1993 | Benedetti et al. | 411/48 |
| 5,211,519 | 5/1993 | Saito | 411/45 |
| 5,286,152 | 2/1994 | Anderson | 411/45 |
| 5,358,299 | 10/1994 | Seto | 296/97.9 |

FOREIGN PATENT DOCUMENTS

| | | |
|---|---|---|
| 0348277 | 12/1989 | European Pat. Off. . |
| 0524091 | 1/1993 | European Pat. Off. . |
| 0596753 | 5/1994 | European Pat. Off. . |
| 4333494 | 4/1994 | Germany . |

Primary Examiner—David M. Mitchell
Assistant Examiner—Kia M. Robinson
Attorney, Agent, or Firm—Fay, Sharpe, Beall, Fagan, Minnich & McKee

[57] ABSTRACT

A rivet type fastener assembly that is especially suited for joining components to vehicle bodies and panels includes resilient legs that extend from the component and through an opening in the panel. An axially elongated pin extends through a hole in the component to a position between the legs. The pin has an enlarged body joined to a head by a reduced size connecting body portion. A retention latch is provided for retaining the pin in selected positions in the hole including a first position where the enlarged body portion is in the space between the legs to prevent movement of the legs laterally toward one another and a second position wherein the relatively smaller intermediate portion is in the space between the legs to permit the legs to be moved laterally toward one another for disconnecting the component from the panel.

13 Claims, 3 Drawing Sheets

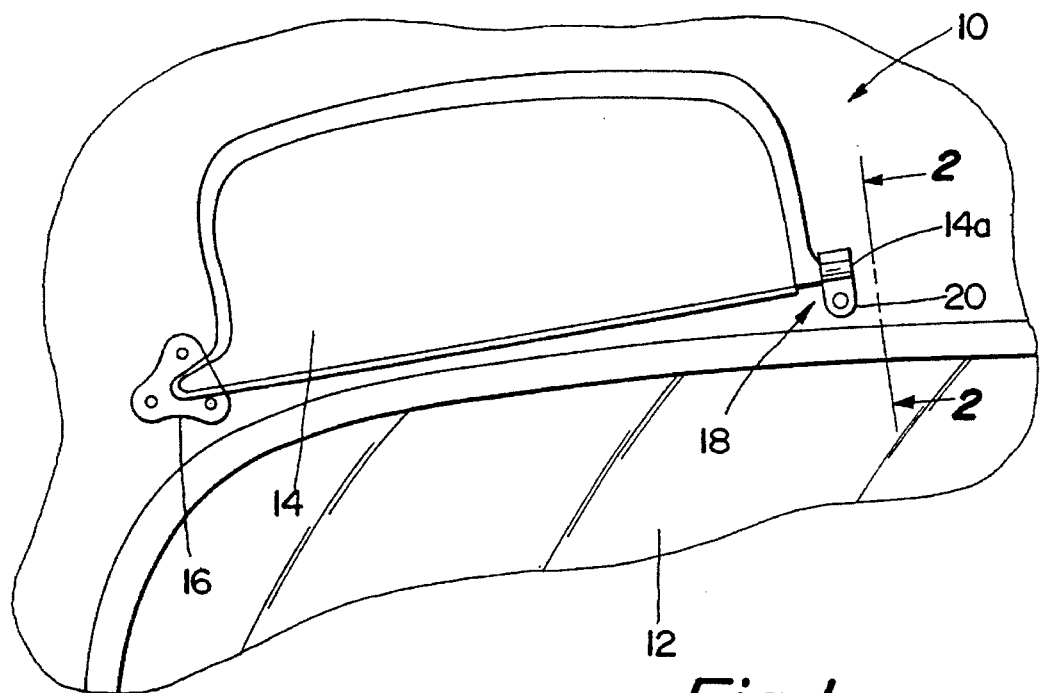
Fig. 1
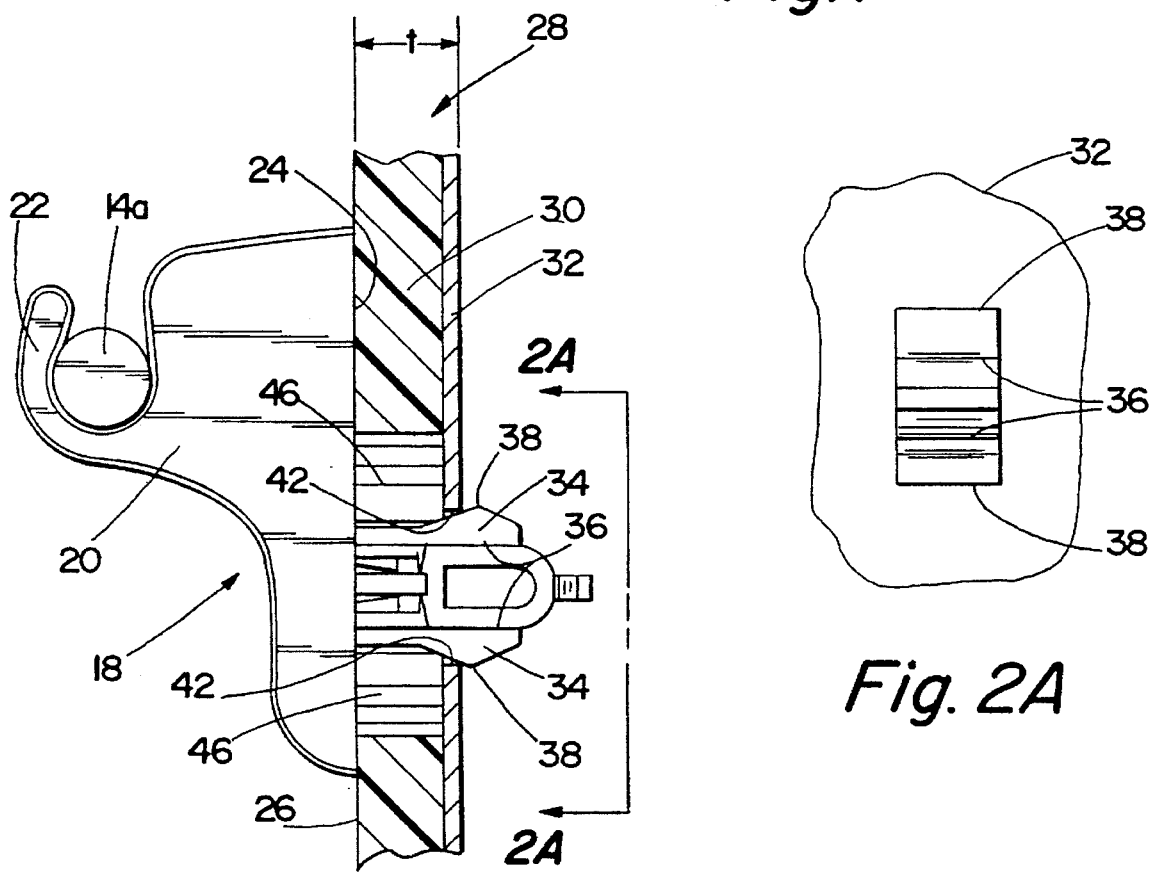
Fig. 2
Fig. 2A

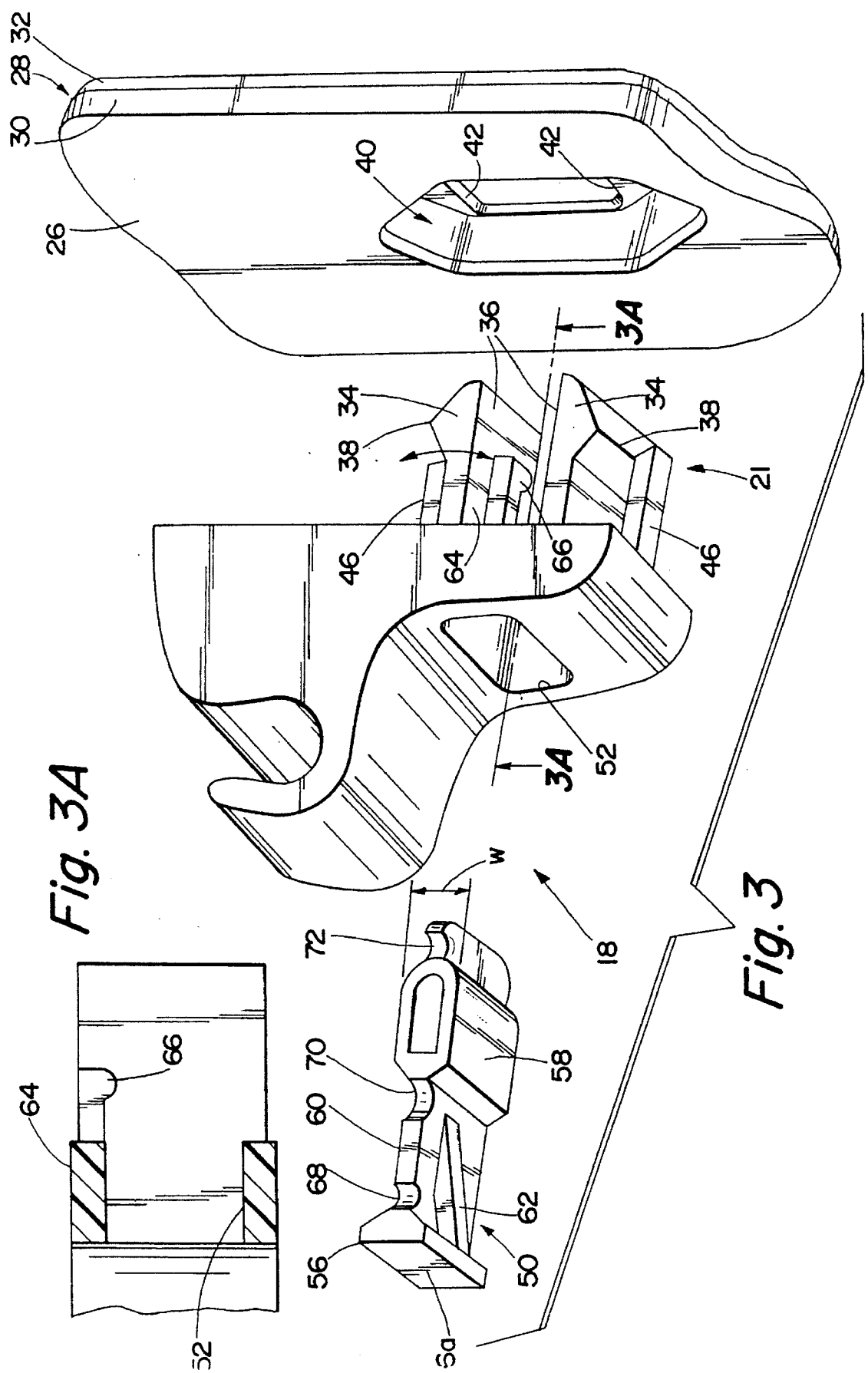

VISOR CLIP ASSEMBLY AND RELEASABLE FASTENER

BACKGROUND OF THE INVENTION

The subject invention is directed toward the art of fasteners and, more particularly, to a push-in type plastic fastener that can be readily released.

The invention is especially suited for incorporation in sun visor components to attach the components to motor vehicle body panels and will be described with reference thereto; however, as will become apparent, the invention is capable of broader application and could be incorporated in a variety of components or used as a separate fastener for many purposes.

Vehicle sun visor support brackets and the associated clips used to hold and support the free end of the visor body have generally been attached to the vehicle body panels or frame components by threaded screws. In the interest of simplifying the assembly process, as well as reducing the time required for installation, it has been recognized that elimination of the use of threaded screws would be desirable. Any alternative fastening system should desirably not, however, increase the number of parts required or result in the need for special installation tools.

SUMMARY OF THE INVENTION

The subject invention provides an arrangement which satisfies the criteria discussed above and allows direct manual installation of such components. The arrangement allows rapid, non-destructive, demounting and disassembly.

In accordance with the invention, there is provided an improved arrangement for connecting a sun visor support component to a vehicle body member. The arrangement includes the combination of a vehicle body member having an opening therethrough with the sun visor support overlying the opening. The visor support has an exposed ,outer surface and an inner base surface that is in contact with the body member. At least a pair of resilient legs extend from the support base through the opening. The pair of legs are spaced apart to substantially engage the periphery of the opening with an open space between the legs. An aperture extends through the support from the outer surface to the base surface in alignment with the open space between the legs. An elongated rigid pin having first and second ends is adapted to extend axially through the aperture into the open space between the legs. The pin has an enlarged head at the first end and an enlarged body adjacent the second end with the head in the enlarged body being connected by a smaller connecting body portion. A retainer is provided for selectively releasably allowing the pin to have plural different positions of axial adjustment relative to the aperture and the space between the legs. The plural different positions of adjustment include a first position wherein the enlarged body is between the legs for preventing the legs from deflecting inwardly away from the periphery of the opening and a second position wherein the pin is retained in the opening with the enlarged body axially outward of the space between the legs.

In accordance with a somewhat more limited aspect of the invention, the retainer includes means for allowing the pin to have a third position of axial adjustment wherein the enlarged body is axially inward of the legs and the connecting body portion is in the open space between the legs.

Generally, the vehicle body member is in the form of a panel having a somewhat resilient outer layer and a rigid inner layer. The opening into which the resilient legs are received extends through both the resilient outer layer and the rigid inner layer. The support base surface engages the resilient outer layer and a stop member extends from the base surface into,engagement with the rigid inner layer to limit compression of the resilient outer layer by the support.

The support with the pin in the second position can be installed merely by inserting the legs into the opening until the stop means engage the hard rigid inner layer of the body member. Thereafter, the pin member is moved to the first position wherein the legs are prevented from retracting inwardly and the support is maintained in position in the opening. However, if it is necessary to remove this support from its mounted position, the pin member is merely pushed inwardly to the third position to allow the legs to retract or deflect inwardly so that they no longer engage with the periphery of the opening.

In accordance with a still further aspect of the invention, there is provided a rivet type fastener adapted to join a first component to a panel and comprising a pair of legs extending from the first component through an opening in the panel. The legs are on opposite sides of an open space and have their opposed inner surfaces spaced apart a distance corresponding generally to the spacing between opposed sides of the opening. Each of the legs include lateral extending portions to engage with the periphery of the opening and at least one of the legs is laterally flexible relative to the opening. A non-circular hole extends through the first component and opens to an aligned position with the open space between the legs and has a portion of its periphery coextensive with the opposed inner surfaces of the leg members. An axially elongated pin extends into the hole and is provided with a head portion on an outer end and enlarged body portion on an inner end. The enlarged body portion is located in spaced relationship from the head and is connected thereto by a relatively smaller intermediate body portion. The enlarged body portion further has a non-circular cross-section in planes perpendicular to the axis of the pin to fit within the periphery of the non-circular hole through the first component but generally correspond to the spacing between the opposed inner surfaces of the leg members. In addition, a retention latch is provided for retaining the pin in selected positions axially in the hole including a first position where the enlarged body portion is in the space between the legs to prevent movement of the legs laterally toward one another and a second position wherein a relatively smaller intermediate portion is in the space between the legs to permit the legs to be moved laterally toward one another for disconnection of the fastener from an engaged position.

Preferably, the head portion of the pin has a cross-section in planes perpendicular to the axis of the pin to correspond to and fit within the non-circular hole through the first component. Also, the retention latch preferably includes spaced notches formed in the pin and a cooperating resilient element that engages in the notches at the selected positions.

As can be appreciated, a primary object of the present invention is the provision of a rivet type fastening arrangement which is particularly suited for mounting sun visor components to vehicle body panels in a manner which permits ready assembly and non-destructive disassembly.

A further object is the provision of a sun visor support element of the type described that can be incorporated directly in the sun visor support and which allows manual installation of the support without the need for special tools or the like.

A further object is the provision of an assembly of the general type described which can be readily molded from plastics and which permits all parts necessary for mounting to be incorporated into a preassembled unit.

BRIEF DESCRIPTION OF THE DRAWINGS

The above and other objects and advantages will become apparent from the following description when read in conjunction with the accompanying drawings wherein:

FIG. 1 is a partial pictorial view showing a vehicle sun visor incorporating the subject invention and mounted over a vehicle window;

FIG. 2 is a cross-sectional view taken on line 2—2 of FIG. 1;

FIG. 2A is a partial elevational view taken on line 2A—2A of FIG. 2;

FIG. 3 is an exploded isometric view showing in detail the sun visor retention clip and its relation to the interior vehicle headliner and support panel;

FIG. 3A is a cross-sectional view taken on line 3A—3A of FIG. 3; and,

DETAILED DESCRIPTION OF THE PREFERRED EMBODIMENT

Figure 4:
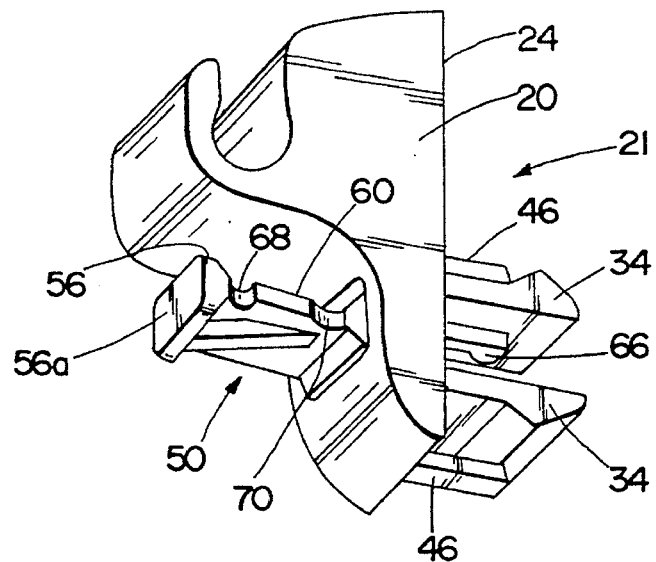
FIG. 4 is an isometric view illustrating the visor retention clip and the rivet in preparation for installation.

Referring more particularly to the drawings wherein the showings are for the purposes of illustrating preferred embodiments of the invention only and not for the purpose of limiting same, FIG. 1 generally illustrates a vehicle sun visor 10 which is shown in a mounted and stored position above a vehicle window 12. The visor assembly 10 includes a visor 14 formed of any suitable material, typically a plastic or fabric, over a suitable interior frame and mounted from a hinge support 16 that allows it to be pivoted from the stored position to a lowered position for use position or swung for use adjacent a side window.

At the right hand end (as viewed in FIG. 1) of the visor 14 there is provided a support clip 18 that acts to hold the visor 14 in the stored position shown, or in a rotated lower position in front of the window 12. The support clip 18 does, however, releasably hold the end of the visor so that the visor can be removed from the clip for swinging laterally to a position of use in front of a side window.

Of importance to the subject invention is the arrangement of the support clip 18 and its mounting to the vehicle headliner and body support. The arrangement which will be described is with reference to the visor support clip 18 but could equally well apply to the support 16.

The overall arrangement of support 18 and its mounted connection to the headliner in vehicle support panel can best be understood by reference to FIGS. 2–3. As shown therein, the support 18 comprises a main support body 20 which is preferably molded of plastic and comprises a rigid body having a resilient body portion 22 carried thereon and sized and arranged so as to resiliently grip the outwardly extending shaft-like end portion 14A of the visor 14.

The body 20 is mounted with its base surface 24 in engagement with the outer surface 26 of the vehicle panel 28. In this embodiment, the panel 28 comprises a relatively resilient headliner 30 and a rigid sheet metal body panel 32 which are joined together and spaced inwardly from the vehicle roof panel (not shown). The headliner portion 30 is, for example, formed from a relatively rigid somewhat resilient, closed cell plastic foam with a skin thereover defining the outer exposed surface 26.

According to the invention, the retainer clip 18 is connected into mounted position by a fastening assembly 21 that includes a pair of resilient leg members 34 that are preferably integral with the body 20 and extend outwardly from the base surface 24 as best shown in FIGS. 2 and 3. Each of the legs 34 are arranged to be resiliently deflectable in the directions shown by the arrows in FIG. 3. Additionally, each of the legs 34 have opposed interior surfaces 36 and oppositely facing exterior surfaces that have a raised portion 38 carried thereon. The length of the legs 34 and the location of the protuberances 38 are designed with respect to the thickness T of panel 28. The length of the legs is such that they extend from base 24 through an opening 40 in panel 28 to the location shown in FIG. 2. Base 24 is then in proper close engagement with surface 26. The opening 40 is, as previously mentioned, arranged to extend completely through the panel 28. A portion of opening 40 which extends through the rigid inner panel portion 32 is of a rectangular configuration as shown in FIG. 3 with opposed planar peripheral portions 42 that are spaced as shown in FIG. 2 relative to the spacing of legs 34 and the location of the protuberances 38.

The support clip body 20 can be moved from the position shown in FIG. 3 into the located position shown in FIG. 2 by extending the legs into opening 40 and applying axial force to the body 22 caused the legs to deflect inwardly as they move into and through the panel portion 32. After moving into the opening 40 and through the opposed peripheral portions 42, the legs can deflect back to their normal outer position to engage with the panel portion 39, as shown in FIG. 2. By properly designing the length of the legs relative to the thickness T of panel 28, proper engagement of the base 24 with the surface 26 takes place. Additionally, it is desirable that the size of the body 20 relative to the opening 40 be such as to completely overly and cover the opening 40 when the clip is in its mounted position.

To limit the inward movement of the legs 34 into the opening 40 and properly engage the base 24 with the surface 26 without unduly compressing it, the assembly is provided with stop members that engage with the outer surface portion of panel member 32. In the subject embodiment there are two stop members identified with the reference numeral 46. These stop members are in the form of rigid pins or posts that are molded integrally with the body 20 and extend therefrom generally parallel to the resilient legs 34 at locations spaced outwardly thereof. As best shown in FIG. 2, the length of the posts 46 is generally only slightly less than the thickness of panel T or slightly less than the thickness of the panel portion 30. The cooperation between legs 34, the posts 46 and the rigid panel portion 32 acts to hold the clip body 20 in position, in a non-rotatable manner. Note that rotation cannot take place because of the shape of the opening 40 and the corresponding shape of the exterior surface portions of the legs 34. It is of course clear that other shapes could be used but the somewhat rectangular shape is generally preferred.

The legs are maintained in the locked or engaged position shown in FIG. 2 by an elongated relatively rigid pin 50. The pin 50 (see FIG. 3) is arranged to enter an opening 52 that extends through the body 20 of the support from the exposed outer surface to the base surface 24. Opening 52 is generally rectangular and is sized and arranged to align with the open space between the inner surfaces 36 of legs 34.

Referring again to FIG. 3 and pin 50, it will be seen that the pin includes an enlarged head portion 56 at a first end and an enlarged body portion 58 adjacent the opposite end. The head portion 56 and the body portion 58 are joined by a reduced thickness connecting portion 60. The head 56 preferably has an outer peripheral shape which is substantially the same as the shape of opening 52. Body portion 58 is also preferably sized and shaped so as to be freely receivable through opening 52 and has a width W which is preferably substantially equal to or only slightly greater than the distance between the opposed inner faces or surfaces 36 of legs 34. Thus, when the pin 50 is moved to the position shown in FIGS. 2 and 5, the enlarged body portion 58 is between the legs 34 to bias them outwardly so they cannot deflect inwardly and are thus maintained in their gripping position behind the panel portion 32 as shown in FIG. 2.

The length of the pin and the distance between the outer surface 56A of head 56 relative to the location of enlarged body portion 58 when in the preferred lock or latching position of FIG. 2 is such that surface 56A forms a smooth continuation of the outer exposed surface of body 20. It should also be noted that there are laterally extending reinforcing portions 62 on each side of the reduced thickness connecting portions 60.

Figure 5:
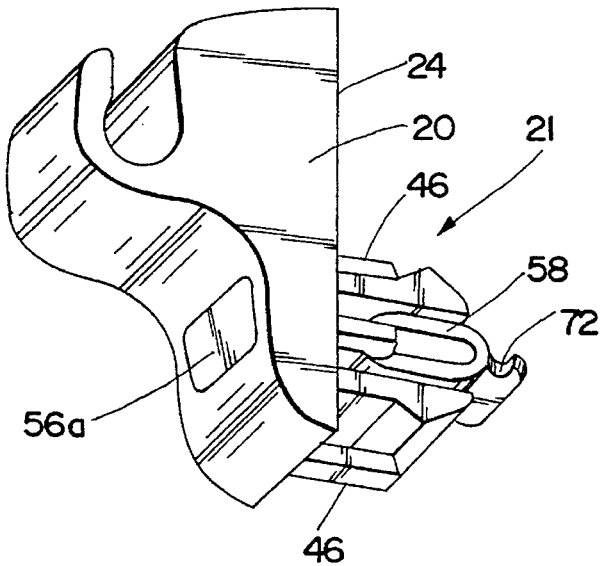
FIG. 5 is an isometric view illustrating the visor retention clip and the rivet pin in their installed relationship and, FIG. 6 is an isometric view illustrating the visor retention clip and rivet pin in their relationship required for removal.
Figure 6:
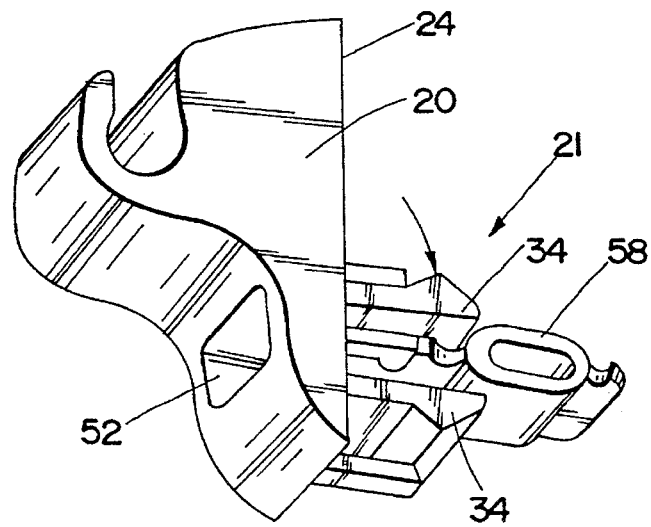

In order to releasably maintain the pin 50 in the locking position of FIGS. 2 and 5, a retainer is provided to engage the pin and prevent its axial movement in the opening until a predetermined minimum axial force is applied thereto. This retainer could take many forms but is best shown in FIGS. 3 and 3A. Note that an arm member 64 extends downwardly adjacent the lower end of opening 52 between the legs 34. The arm 64 has an inwardly extending bead or engagement portion 66 that is arranged to enter into suitably shaped notches 68, 70 and 72 formed on pin 50. Notch 70 is located so that when the pin is inserted to the position at which notch 70 is engaged by bead 66, the enlarged body portion 58 is properly located between legs 34 in the location shown in FIGS. 2 and 5. This prevents inward deflection of legs 34 and thereby prevents the body 20 from being removed from the mounted position shown. However, the arrangement of pin 50 relative to legs 34 is such that if the pin is forced inwardly a greater distance so that notch 68 comes into engaged relationship with bead 66 then the reduced thickness portion 60 of the pin is between legs 36 as shown in FIG. 6. Legs 34 can then deflect radially inwardly as shown by the arrows in FIG. 6 allowing the body 20 to be withdrawn from opening 40. The installation and removal of the assembly can thus take place without any special tools other than some form of rigid member to force the pin axially inward.

As can be seen from the foregoing, the arrangement is such that merely by moving the pin between two axially spaced positions the part can be locked or removed for replacement or repair as needed.

According to the preferred embodiment of the subject invention, it is also desirable that the pin member be associated with the body 20 in a manner which allows it to be semi-permanently affixed thereto in a preinstallation position and for shipping. This preliminary preinstallation position is shown in FIG. 4. Note that the lower or inner end of the pin and the notch 72 are sized so that when the pin is pushed into the opening 52 a latching of bead 66 in recess 72 takes place prior to entry of the body section 58 into the locked position between legs 34. In this preliminarily engaged position, the legs can still move together or deflect toward one another for original installation in the opening 40. However, the pin and the body 20 can be shipped, handled, and stored as a unit if desired. It should, of course, be understood that if desired, it can be possible to dispense with this latched position and use a pin without the lower notch 72.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A rivet type fastener joining a first component to a panel comprising:

a pair of legs extending from the first component through an opening in the panel, the leg members being on opposite sides of an open space and having oppositely facing exterior surfaces spaced apart a distance corresponding generally to the spacing between opposed sides of the opening in the panel and carrying latching protuberances thereon, at least one of the legs being laterally flexible relative to the opening to permit flexure of said at least one leg toward the other leg for insertion into and removal from the opening in the panel;

a non-circular hole through the first component, said hole opening to and aligned with the open space between the legs and having a portion of its periphery coextensive with the opposed inner surfaces of the leg members;

an axially elongated pin extending into the hole and having a head portion on an outer end and an enlarged body portion on an inner end, the enlarged body portion being located in spaced relationship from the head portion and connected thereto by a relative smaller intermediate body portion, the enlarged body portion further having a non-circular cross-section in planes perpendicular to the axis of the pin member which corresponds in shape and closely fits within the periphery of the non-circular hole through the first component and generally corresponds to the spacing between the opposed inner surfaces of the leg members a retention latch for retaining the pin in selected positions in the hole including a first position where the enlarged body portion is in the space between the legs to prevent movement of the legs laterally toward one another and a second position wherein the relatively smaller intermediate portion is in the space between the legs to permit the legs to be moved laterally toward one another, said retention latch including at least one resilient arm extending between the legs and carrying an engagement portion; and, notches in the pin engageable with the engagement portion of the resilient arm and located to define the first and second positions.

2. The rivet type fastener of claim 1 wherein the head portion has a cross-section in planes perpendicular to the axis of the pin that corresponds to and fits within the non-circular hole through the first component.

3. The rivet type fastener of claim 1 wherein the enlarged body portion has a generally rectangular cross-section in planes perpendicular to the axis.

4. The rivet type fastener of claim 3 wherein the enlarged body portion enters between the legs and the legs engage on opposite sides of the generally rectangular cross-section and assist in preventing rotation of the pin member in the non-circular hole.

5. The rivet type fastener of claim 3 wherein the head portion of the pin is shaped and sized to completely fill the non-circular hole through the first component.

6. The rivet type fastener of claim 1 wherein the first component is a support member for holding a vehicle sun visor in a located position in a vehicle.

7. In combination:

a vehicle body member having a non-circular opening therethrough;

a sun visor support overlying the opening, said support having an exposed outer surface and an inner base surface in contact with the body member;

at least a pair of resilient legs extending from the support and through the opening, said pair of legs being spaced apart to substantially engage the periphery of the opening with an open space between the legs;

an aperture through the support from the outer surface to the base surface in alignment with the open space between the legs and having a cross-sectional shape to generally correspond to the cross-sectional shape of the open space between the legs an elongated rigid pin having first and second ends and adapted to extend axially through the aperture into the open space between the legs and having an enlarged head at the first end and an enlarged body adjacent the second end, the head and the enlarged body being connected by a smaller connecting body portion, and a retainer for selectively releasably allowing the pin to have plural different positions of axial adjustment relative to the aperture and the space between the legs including a first position wherein the enlarged body is between the legs for preventing the legs from deflecting inwardly away from the periphery of the opening and a second position wherein the pin is retained in the opening with the enlarged body axially outward of the space between the legs, the retainer including a resilient arm extending from the support at a location between the legs and having an engagement portion; and, notches in the pin, the notches engageable with the engagement portion of the arm and located to define the first and second positions.

8. The combination as defined in claim 7 wherein the enlarged head is sized and shaped to substantially fill the aperture when the pin is in the first position.

9. The combination as defined in claim 8 wherein the head has an axial end surface which is generally flush with the exposed outer surface of the support when the pin is in the first position.

10. The combination as defined in claim 8 wherein the retainer includes means for allowing the pin to have a third position of axial adjustment wherein the enlarged body is axially inward of the legs and the connecting body portion is in the open space between the legs.

11. The combination as defined in claim 10 wherein rotation limiting means are provided for preventing rotation of the support relative to the opening in the body panel.

12. The combination as defined in claim 11 wherein the rotation limiting means comprises cooperating surfaces on the legs and the periphery of the opening.

13. The combination of claim 7 wherein the vehicle body member comprises a panel having a relatively resilient outer layer and a rigid inner layer, the said opening extending through both the resilient outer layer and the rigid inner layer, and the support base surface engaging the resilient outer layer with a stop member extending from the base surface into engagement with the rigid inner layer to limit compression of the outer layer.

* * * * *